Patented Apr. 1, 1924.

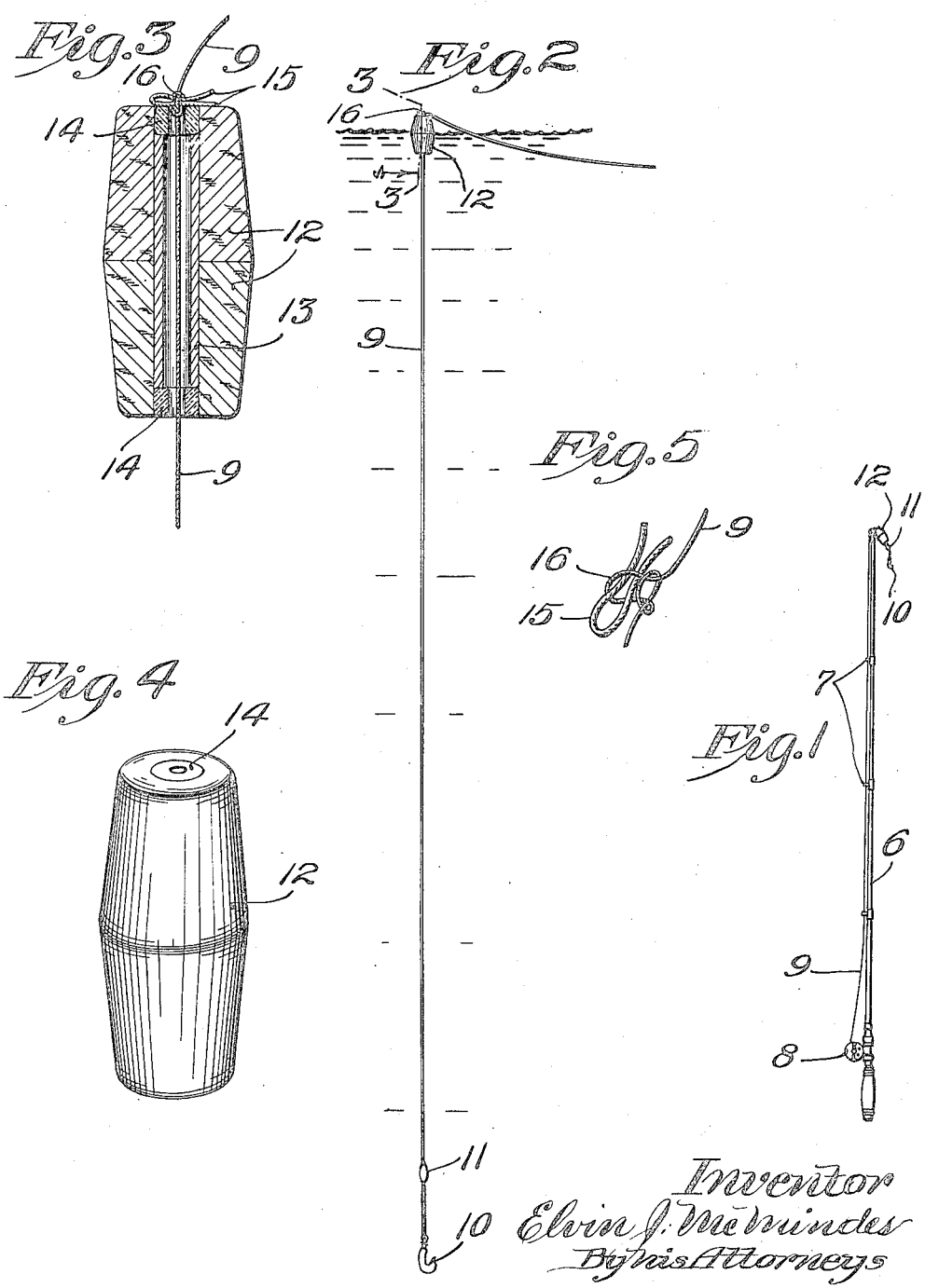

1,489,088

UNITED STATES PATENT OFFICE.

ELVIN J. McMINDES, OF MINNEAPOLIS, MINNESOTA.

CASTING FLOAT.

Application filed May 15, 1922. Serial No. 560,937.

*To all whom it may concern:*

Be it known that I, ELVIN J. MCMINDES, a citizen of the United States, residing at Minneapolis, in the county of Hennepin and State of Minnesota, have invented certain new and useful Improvements in Casting Floats; and I do hereby declare the following to be a full, clear, and exact description of the invention, such as will enable others skilled in the art to which it appertains to make and use the same.

My invention provides an improved arrangement of a float on a fish line, whereby certain improved results are obtained, and, generally stated, the invention consists of the novel construction and combinations of parts hereinafter described and defined in the claim.

Hitherto, it has not been practical to use a float on a line applied to a rod equipped with a reel, for the following reasons: If a float be applied to a casting line, it must be applied very close to the hook or against the sinker, which is always close to the hook, and when so applied, in accordance with the provisions hitherto made, the float would keep the hook from sinking to the proper depth. If the float be secured to the line a considerable distance from the hook and sinker, it would be impossible to use the line with the rod because the float would not, of course, pass through the line-guiding eyes on the rod.

I overcome all of these difficulties by providing a float capable of sliding movements on the line to and from a position close to the hook and sinker, and providing the line, at a suitable point, with a float stop, which will, nevertheless, pass freely through the eyes of the rod. This arrangement permits the float to bear against the sinker while casting and then permits the hook and sinker to sink to the proper depth after they have struck the water.

The preferred form of my improved float and the preferred manner of applying the same to the line is illustrated in the accompanying drawings, wherein like characters indicate like parts throughout the several views.

Referring to the drawings:

Fig. 1 is a side elevation showing a reel-equipped casting rod, the line of which is equipped with a float, in accordance with my invention;

Fig. 2 is an elevation showing the position of the float on the line when in the water;

Fig. 3 is a section on the line 3—3 of Fig. 2;

Fig. 4 is a perspective of the float removed from the line; and

Fig. 5 is a perspective showing the preferred manner of applying the float stop to the line.

The rod 6 has the customary line-guiding eyes 7 and is equipped with a reel 8 and line 9. On the end of the line is a hook 10 and, at the proper short distance from the hook, the line is provided with an ordinary sinker 11.

The float 12 is preferably of cork and is shown as made up of two reversely tapered truncated cones cemented together and onto an axial tubular core 13. The core 13 is preferably made of hollow cane reed and is terminated short of the ends of the float so as to leave seats into which are inserted line-guiding bushings 14 preferably of glass.

As a suitable upper stop applied to the line, I preferably employ a short piece of cord or heavy fish line 15 bent U-shaped and inserted through a slip knot 16 formed in the line 9. This knot, of course, may be readily formed at any place on the line, and when it is drawn taut against the flexible stop 15, it will hold the latter in proper position. The flexible stop 15 and the knot 16 will not pass through the small axial perforations of the bushings 14 but will very freely pass through the much larger openings in the guide eyes 7 of the rod.

With the above arrangement, when the rod and line are ready for casting, the float 12 will be against the sinker 11, as shown in Fig. 1, and the stop 15 will be located somewhere along the rod, usually between the eyes 7, but in some cases may even be wound with the line upon the reel. In any event, when the hook is cast, the weight of the float will be added to that of the sinker and hook and will give such increases in momentum that the hook may be cast to a very considerable distance. The flexible stop 15 and knot 16 will pass through the eyes of the rod under very little increased frictional resistance over that produced by the line, but this slightly increased friction will be more than offset by the increased momentum afforded by the float in the casting action.

As the line passes axially upward through the float, the float will set upright in the water, projecting more or less above the surface of the water and, hence, will be very sensitive to nibbling actions on the bait.

Manufacture of the float is facilitated by making the same in two sections, as best shown in Fig. 3, and by securing the same, by cement or otherwise, to the tubular core 13. In actual practice, I have found that this float applied as described very greatly facilitates both casting and the catching of fish.

What I claim is:

A fish line float comprising a tubular core of hollow cane reed and a plurality of cork sections telescoped around and secured to said core, said core being terminated short of the ends of the float and said float having glass line-guiding bushings inserted through the ends thereof and being of less diameter than the cane reed.

In testimony whereof I affix my signature.

ELVIN J. McMINDES.